UNITED STATES PATENT OFFICE.

BRUNO TERNE, OF PHILADELPHIA, PA., ASSIGNOR OF THREE-FOURTHS TO DANIEL BAUGH AND EDWIN P. BAUGH, BOTH OF SAME PLACE.

UTILIZING TANK-WATERS OF SLAUGHTER-HOUSES.

SPECIFICATION forming part of Letters Patent No. 269,487, dated December 19, 1882.

Application filed June 9, 1882. (No model.)

*To all whom it may concern:*

Be it known that I, BRUNO TERNE, a citizen of the United States, and a resident of Philadelphia, Pennsylvania, have invented an Improvement in Utilizing Tank-Waters of Slaughter-Houses, &c., of which the following is a specification.

My invention relates to the utilizing of tank-waters of slaughter-houses, packing-houses, and bone-boiling and other analogous establishments; and the invention consists in combining concentrated tank-waters with animal charcoal, the composition forming an inodorous manure or manure ingredient.

In carrying out my invention the tank-waters, which differ in consistency, as shown by differences in specific gravities, from 1° to 5° Baumé, are concentrated by any known process to an extent which may be varied without departing from the main feature of my invention. I may state, however, that a concentration of from 15° to 20° Baumé will be suitable, the aim being to obtain a solution a gallon of which will contain about one-half pound of nitrogenous matter. I mix the concentrated tank-water with animal charcoal in proportions which may differ to some extent, according to the product sought for, the proportion of animal charcoal to the concentrated tank-water depending upon the desired ammoniacal strength of the resultant manure or manure ingredient. The less animal charcoal used the greater will be the ammoniacal strength, and the greater the proportion of animal charcoal the less will be that strength.

The mixing of the concentrated liquors with the charcoal may be done by hand or machinery, and after a complete mixing the product should be dried either naturally or artificially, the dried product being sent to the market either in lumps or ground to a powder.

I claim as my invention—

The mode herein described of utilizing tank-waters, the said mode consisting in first concentrating the said tank-waters, then mixing the same with animal charcoal, and finally drying the composition, as specified.

In testimony whereof I have signed my name to this specification in the presence of two subscribing witnesses.

BRUNO TERNE.

Witnesses:
HARRY DRURY,
HARRY SMITH.